D. W. MOODY.
OCCUPANT OPERATED VEHICLE AND STEERING APPARATUS.
APPLICATION FILED JAN. 13, 1919.
1,327,960.
Patented Jan. 13, 1920.
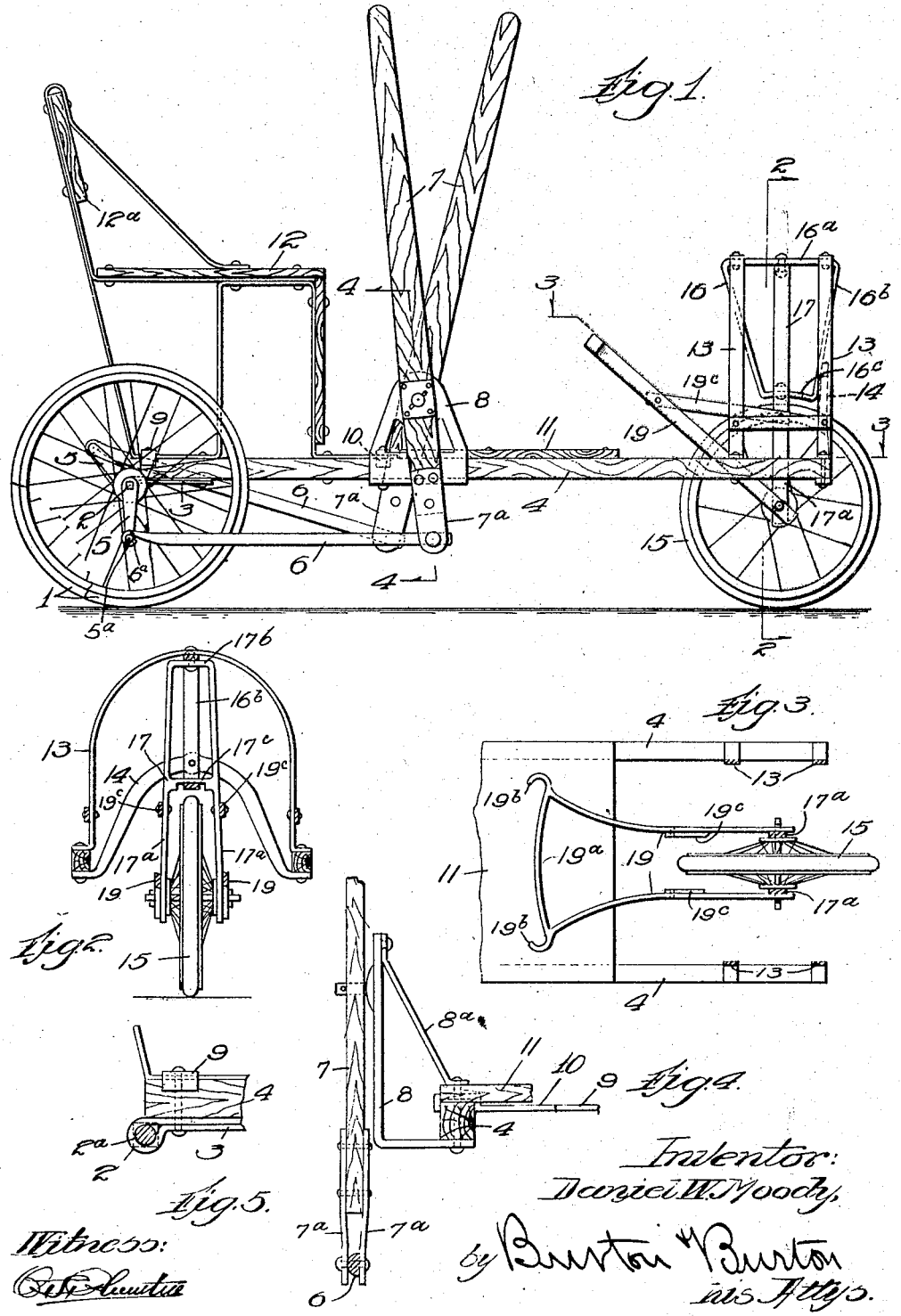

UNITED STATES PATENT OFFICE.

DANIEL W. MOODY, OF CHICAGO, ILLINOIS.

OCCUPANT-OPERATED VEHICLE AND STEERING APPARATUS.

1,327,960. Specification of Letters Patent. Patented Jan. 13, 1920.

Application filed January 13, 1919. Serial No. 270,780.

*To all whom it may concern:*

Be it known that I, DANIEL W. MOODY, a citizen of the United States, residing at Chicago, in the county of Cook and State of Illinois, have invented certain new and useful Improvements in Occupant - Operated Vehicles and Steering Apparatus, of which the following is a specification, reference being had to the accompanying drawings, forming a part thereof.

The purpose of this invention is to provide an improved construction particularly of a vehicle-steering means, and incidentally to provide improved detail constructions of other parts of an occupant-operated vehicle. It consists in the elements and features of construction shown and described, as indicated in the claims.

In the drawings:

Figure 1 is a side elevation of an occupant-operated vehicle, embodying this invention.

Fig. 2 is a section at the line, 2—2, on Fig. 1.

Fig. 3 is a section at the line, 3—3, on Fig. 1.

Fig. 4 is a section at the line, 4—4, on Fig. 1.

Fig. 5 is a detail section of the rear axle bearings.

The drawings represent the present invention embodied in an occupant-propelled vehicle having a pair of rear drive wheels, 1, 1, mounted rigidly upon a square axle, 2, which is reduced at the end to round form as seen at 2ª, in Fig. 5 for journaling bracket members made of folded strap member, 3, folded to embrace and form a journal bearing for said reduced ends, 2ª, as seen in said Fig. 5. Said strap members are secured at the rear ends of longitudinal frame bars, 4, 4. Said axle has at its opposite ends, cranks, 5, 5, which are mounted on the axle with one of them offset about 45 degrees from a position diametrically opposite the other as seen in Fig. 1, to avoid the liability of dead center difficulties in operating, by the hand levers, 7, 7, which are connected by a pitman, 6, 6, with the crank wrists, 5ª, respectively. These hand levers, 7, are pivotally mounted upon brackets, 8, 8, which are mounted upon the side bars, 4, 4, respectively. Each of these brackets, 8, is angle-shaped, having its vertical member offset some distance outwardly from the side bar, 4, upon which the bracket is mounted, and having its upper end braced down to the side bar by the oblique brace, 8ª, as seen in Fig. 4. The side bars, 4, 4, are tied together by cross bars, 9 and 10, the former at the rear end of the longitudinal side bars and the latter near the position of the brackets, 8, 8. The said side bars are further tied together and the frame is stiffened by the floor, 11, mounted upon two side bars immediately forward of the cross bar, 10, and extending for a suitable distance to accommodate the feet of the occupant. The pitman, 6, 6, for connecting the operating handle, 7, with the crank, 5, are preferably formed of half round bars, as seen in Fig. 4 mounted with the flat side inward and engaged for pivotal connection with the operating levers between two fork arms formed by bars, 7ª, bolted at opposite sides of the lower end of the operating lever, as seen in Fig. 4. For pivotal connection of the rear end of the pitmen with the crank wrist, the half round bar is twisted 90 degrees and at said twisted end portion it is formed into an eye 6ª to embrace the crank wrist to which the flat side is thus presented for bearing. A suitable seat, 12, is mounted upon the rear end of the frame structure as seen in Fig. 1, in such position that the operating handles, 7, will be in convenient reach of the occupant of such seat.

The steering means shown and applied to this occupant-operated vehicle is not designed to be limited to use in such a vehicle, but is of general application. It will now be described in the particular form shown, that is, as applied to this particular vehicle. At the forward end of the frame bars, 4, they are connected by an arch structure which comprises two bows, 13, 13, in transverse parallel planes at a substantial distance apart, the top of the arch being at a distance substantially above the top of the steering wheel, and as shown, at a distance nearly equal to the diameter of the wheel above the top of the latter for the purpose, as will hereinafter appear, of affording a long vertical pivot bearing, or spread between bearings for the oscillation of the steering wheel in its steering action. In addition to the two arch bows, 13, 13, there is provided a third arch-bow, 14, lower than bows, 13, 13, and only a little more than high enough to accommodate the wheel under it. The two parallel arch bows, 13, 13, are rigidly connected together by a foreand-aft-extending device, 16, which constitutes a pivot support for the steering wheel, and in the form shown is an open frame or skeleton, trapezoidal in form with its wider end at the top and its lower end just a little above the top of the steering wheel, 15. Said wider end extends between and rigidly joins the arch bows, 13, 13, at the top. The forward side, 16ᵇ, of this trapezoidal pivotal support extends down behind the bow of the lower arch member, 14, and is bolted thereto, thereby further increasing the rigidity of the arch structure and of the pivotal support in relation thereto. The steering-wheel fork frame, 17, is vertically pivoted to this pivot support, 16. As shown, this steering wheel fork frame is a skeleton structure, comprising the fork arms, 17ᵃ, which form the sides of the skeleton and are extended up above the wheel and connected at their top by the cross-bar, 17ᵇ, being also connected by a cross-bar, 17ᶜ, said two cross-bars, 17ᵇ, and 17ᶜ, being spaced apart so that they will pass between the upper and lower sides of the trapezoidal frame, 16. Said frame constitutes the pivot support, as seen in Fig. 1, which shows the two cross bars, 17ᵇ and 17ᶜ, crossing the two bars, 16ᵃ and 16ᶜ, of said trapezoidal pivot support, and being pivotally connected thereto respectively, the two pivots connected being in alinement with each other, and, as shown, and for most purposes preferably, in alinement with the axle of the steering wheel. The steering wheel is journaled in any convenient manner in the lower ends of the fork arm. The opening in the skeleton trapezoidal pivotal support is adequate to permit the four-sided upper portion of the steering wheel fork frame to swing about the vertical pivot of the two members through a sufficient angle for the purpose of steering. For operating the steering wheel fork frame for steering, the two fork arms, 17ᵃ, are each provided with rearwardly-extending lever arms, 19, 19, which are spread apart at their rear ends and connected by a cross-bar, 19ᵃ, which extends beyond the end of the lever arm and terminates in abutments, 19ᵇ, which as shown are hook-shaped projecting rearwardly and forming side guards by which the toe of the operator may engage the lever structure which is formed by the two lever arms and junction piece, for swinging the steering wheel fork frame in one direction or the other. The cross-bar, 19ᵃ, it will be understood constitutes a foot-rest for the operator, and limited steering can readily be effected by the mere frictional engagement of the foot of the operator upon this bar without engaging the hook abutments 19ᵇ, at the ends of said bar, and which in that position constitute substantially the rear ends of the lever arms, 19, connected with the steering wheel fork arms, respectively as described. These lever arms are preferably provided with braces, 19ᶜ, as seen in Fig. 1, extending from a higher point on the fork arm rearwardly to the lever arm, and having the effect of affording a wide base for the lever arm on the fork arm.

It will be understood that the steering element need not be a load-carrying wheel, and in a water vehicle, the steering element may not necessarily be carried in the fork arms, but may be connected in any proper manner to the oscillating frame, which in the structure shown constitutes the steering wheel fork frame, but which is to be considered broadly as an element for turning a steering device, whether it be a wheel or any other steering device appropriate for the type of vehicle in which this invention consisting of this steering means is embodied.

I claim:

1. A vehicle steering device comprising a substantially upright transverse arch supported upon the vehicle to be steered; a pivot support consisting of a member which is relatively extended in a fore-and-aft direction depending rigidly from the crown of the arch, and a steering element carrier which is relatively extended transversely to said direction, pivoted vertically to said depending support.

2. In the construction defined in claim 1, one of said relatively extended members being an open frame structure and the other of them being pivoted in the opening of the first between the upper and lower sides thereof.

3. In the construction defined in claim 1, the steering element carrier having its lower portion comprising fork-arms between which the steering element may be mounted, and operating lever arms extending from said fork-arms respectively.

4. In the construction defined in claim 1, the steering element being a load-supporting wheel, and the steering element carrier having a lever arm for turning it about its pivotal support.

5. In a hand-propelled vehicle in combination with the vehicle frame, a steering wheel mounted in the forward end of the frame, said frame comprising a transversely extending arch rigid with the frame, said arch comprising two parallel members in transverse planes, a pivot supporting member extending in a fore and aft plane rigidly depending from the arched members and constituting a rigid connection between them at the top of the arch; a steering wheel fork-member having its upper part above the wheel extending in a transverse vertical plane and vertically pivoted to said pivot support, one of said two parts,—viz., the fork-member and the pivot support,—being apertured and the other extending through said aperture for their pivotal connection at their intersection, the steering wheel being journaled between the fork arms, and steering lever arms extended rearward from the fork-arms respectively.

6. In the construction defined in claim 5 foregoing, the steering lever arms being rigidly connected forward of their rear ends, the connection constituting a foot-rest between the lever arm terminals.

In testimony whereof I have hereunto set my hand at Chicago, Illinois, this 8th day of January, A. D., 1919.

DANIEL W. MOODY.